United States Patent
Thomas (10) Patent No.: US 7,325,081 B2
(45) Date of Patent: Jan. 29, 2008

(54) CRC DATA PROTECTION SCHEME FOR NON-BLOCK-ORIENTED DATA

(75) Inventor: David Thomas, Wellington, CO (US)

(73) Assignee: LSI Logic Corporation, Milpitas, CA (US)

( * ) Notice: Subject to any disclaimer, the term of this patent is extended or adjusted under 35 U.S.C. 154(b) by 444 days.

(21) Appl. No.: 10/807,968

(22) Filed: Mar. 24, 2004

(65) Prior Publication Data
US 2005/0216814 A1    Sep. 29, 2005

(51) Int. Cl.
G06F 3/00    (2006.01)
G06F 5/00    (2006.01)

(52) U.S. Cl. ............................ 710/52; 710/52; 714/758
(58) Field of Classification Search .................. 710/52, 710/54, 56; 714/758
See application file for complete search history.

(56) References Cited

U.S. PATENT DOCUMENTS

| | | | | |
|---|---|---|---|---|
| 4,241,420 A | * | 12/1980 | Fish et al. ................... | 711/112 |
| 6,009,547 A | * | 12/1999 | Jaquette et al. ............. | 714/758 |
| 6,467,060 B1 | * | 10/2002 | Malakapalli et al. ........ | 714/758 |
| 6,757,791 B1 | * | 6/2004 | O'Grady et al. ............. | 711/154 |
| 6,765,739 B2 | * | 7/2004 | Hogan et al. ................. | 360/60 |

OTHER PUBLICATIONS

"PCTechGuide: DDR DRAM," Oct. 12, 2003.*

* cited by examiner

Primary Examiner—Alford Kindred
Assistant Examiner—Chun-Kuan (Mike) Lee
(74) Attorney, Agent, or Firm—Yee & Associates (57) ABSTRACT

A hardware-controlled data protection scheme can be used on a device providing buffering between two different protocols, especially where at least one of the protocols does not use fixed length blocks. A fixed block size is arbitrarily imposed on the data in order to calculate a cyclical redundancy code (CRC) for the block. Block sizes are restricted to a value of $2^n$, e.g., 2, 4, 8, 16, etc. The device is able to time-share and to receive or send data on more than one port while sharing the CRC engine between the ports. Intermediate values of the CRC for a given port are temporarily saved in a CRC register file. As a block of data for a given port is completed, a final CRC value for the block is saved to a CRC random access memory (RAM) located on the device and the entry in the register file is cleared. When the data is then output from the device, the CRC for the block is recalculated and checked against the saved value to be sure that they match.

14 Claims, 5 Drawing Sheets

CRC DATA PROTECTION SCHEME FOR NON-BLOCK-ORIENTED DATA

BACKGROUND OF THE INVENTION

1. Technical Field

The present invention is directed generally toward a method and apparatus for providing hardware-controlled data integrity for data that does not have a fixed block length.

2. Description of the Related Art

When writing to a device such as a tape, it can be necessary to provide buffering between a bus and an actual device to smooth out the bursts from the bus into a steady flow onto the tape. This can be handled by a double data rate (DDR) memory device, which allows data to be written and read from the same memory at different rates. Off-the-shelf DDR memory devices are available in a variety of sizes that vary both in the number of bits that can be accessed in parallel and in the number of bits that can be stored. In order to support a high data rate, it is desirable to have the capability to handle a large number of bits in parallel, e.g., 32 bits.

As in all forms of data transmission and storage, whether temporary or permanent, it is necessary to ensure the integrity of the data during the short time that it resides on the DDR memory device. This data integrity can be ensured by on of several means.

One exemplary means is by the addition of a single parity bit to a fixed-size set of bits, with the value of the parity bit determined by the values of the set of bits. To add an odd parity to a string of n bits, a single bit can be added to ensure that the number of ones in the string is odd. For example, to transmit the four-bit string 1100, one adds a 1 parity bit at the end and transmits the string 11001. If an error occurs, e.g. the string is received as 11011, the receiving device determines that the total number of ones is even, so it is clear that an error has occurred. However, using the single parity bit, it is impossible to determine which bit is in error, so the data must be resent.

Error correction codes (ECCs) carry this one step farther, by providing enough information that the error can be pinpointed by location and corrected, as long as there are only a limited number of errors in the group of bits. The downside of an ECC is that it adds a number of bits to the data stream. For example, using the Hamming code, a common error correction code, three parity bits must be added to four bits of data to ensure that the location of an error can be pinpointed. Luckily, the ratio of data to parity does not remain quite this high, although it is still significant: a four-bit Hamming code will protect eight bits of data; a five-bit code will protect twenty-four bits of data; a six-bit code will protect twenty-eight bits of data, and a 7-bit code will protect thirty-two bits of data. Due to the structure of this code, it can correct a single error or detect several errors, but cannot correct a large number of errors. Other EEC codes will correct n errors and detect n+m errors, with n and m determined by the code formula and number of bits protected.

A cyclical redundancy code (CRC) is another technique, used to protect blocks of data, called frames. For each frame, an n-bit sequence, called a Frame Check Sequence (FCS) is added to the frame. The FCS is calculated such that the new frame, with FCS appended to the original frame, is exactly divisible by a polynomial. When the data is used, the new frame is divided by the same polynomial; if the remainder is not zero, there is an error in the frame.

In order to provide data protection during temporary storage in a DDR memory device, as described above, any of these approaches can be used, if one is willing to deal with the drawbacks. For example, when using a Hamming code with a high data-rate, it becomes necessary to provide either two 32-bit or three 16-bit DDR memory devices in order to pass through both the data and the added code.

In the same situation, a cyclical redundancy code that works on frames would require only one 32-bit DDR memory device. Typically, in a DDR memory device, the application uses a single frame check sequence (FCS) for a large block, such as an entire SCSI command transfer. However, when working with data that is not in fixed lengths, the FCS must be generated and checked by software, a much slower process. With the slower capabilities of software, it is tempting to generate an FCS for as large a block as possible, although this degrades the protection capabilities.

It would be desirable to provide a method of protecting data that is not organized in fixed-length blocks, where the method would provide a high degree of reliability using only one DDR memory device and without resorting to a software-controlled CRC.

SUMMARY OF THE INVENTION

The method and device of the invention provide for hardware-controlled data protection that can be used on a device providing buffering between two different protocols, especially where at least one of the protocols does not use known-length blocks. A fixed block size is arbitrarily imposed on the data as it enters the buffering device, in order to calculate a cyclical redundancy code (CRC) for the block. Block sizes are restricted to a value of $2^n$, e.g., 2, 4, 8, 16, etc. The device is able to multiplex between ports while sharing the CRC engine between the ports. Intermediate values of the CRC for any given port are temporarily saved in a CRC register file. As a block of data for a given port is completed, a final CRC value for the block is stored in a random access memory (RAM) and the register file entry is cleared. When the data is then output from the device, the CRC for the block is recalculated and checked against the saved value to be sure that they match.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
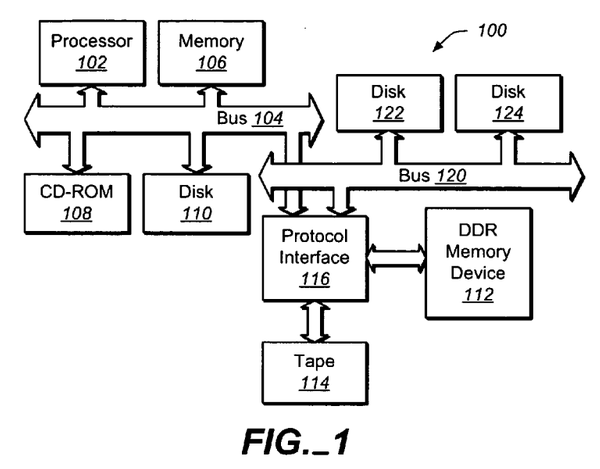
FIG. 1 is a block diagram of a computer system on which an embodiment of the invention can be practiced.

An embodiment of the invention will now be explained with reference to the drawings, in which the invention is embodied in a protocol interface chip that is connected to a DDR SDRAM (double data rate synchronous, dynamic random access memory) device. FIG. 1 shows a pictorial representation of a portion of a data processing system 100 in which the present invention may be implemented. In this drawing, processor 102 is connected by bus 104 to memory 106, disk drives 108, 110, and tape drive 114. Tape drive 114 is connected to the bus through protocol interface device 116, which is also connected to DDR memory device 112. Bus 120 connects protocol interface 116 to additional disk drives 122 and 124. It will be understood that this diagram does not show all the elements of data processing system 100 or all the devices connected to bus 104 and bus 120, but only enough to clarify the relationship between claimed elements.

Figure 2:
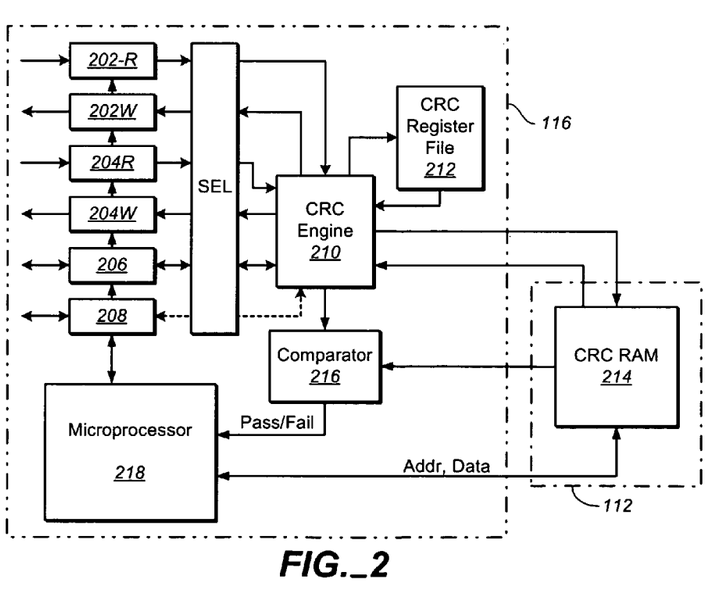
FIG. 2 is a block diagram of the elements of the device that buffers the data transfer.

FIG. 2 is a block diagram of the elements of protocol interface device 116 and DDR memory device 112 of FIG. 1. In this exemplary embodiment, device 116 has two ports 202R, 202W connected to bus 104 and the devices connected to it and two ports 204R, 204W connected to bus 120. These four ports can read and write to devices on their respective bus, e.g., ports 202R and 202W are used to read and write to bus 104 while ports 204R and 204W are used to read and write to bus 120. At the same time, port 206 is connected to tape drive 114. Port 206 can be used as an input port when the tape is read or as an output port when the tape is written. A sixth port 208 is supplied for software data and is used when software control is used rather than full hardware control. A selection device SEL connects one of the ports 202R, 202W, 204R, 204W, 206, 208 at a time to the CRC engine 210. As input from the ports is received, the data is stored in blocks of memory that have a length of $2^n$. The CRC engine 210 uses the data to calculate a cyclical redundancy code (CRC) value for each block. The CRC engine 210 maintains a running CRC value for each port while the data is being stored; as the CRC engine 210 switches between ports, these intermediate values are stored in the CRC register file 212. As each block is completed, a final CRC value for the block is written to CRC RAM 214, where it is maintained until it is overwritten, and the corresponding entry in the register file 212 is reset. Information in the CRC RAM 214 is stored in a mapped relationship to the corresponding data that is stored in a data memory. When the data is being read from the DDR SDRAM, the CRC engine 210 will be given the data values stored in memory so that it can again calculate a CRC value. This value is fed to the comparator 216, where the newly calculated CRC value is compared to the CRC value that was previously stored in the CRC RAM. If the two values match, the data is correct; if not, an error has occurred and corrective action is initiated. Results from the comparator 216, as well as data stored in the CRC RAM 214, are sent to the microprocessor 218, where they can be written from appropriate ports.

Figure 3A:
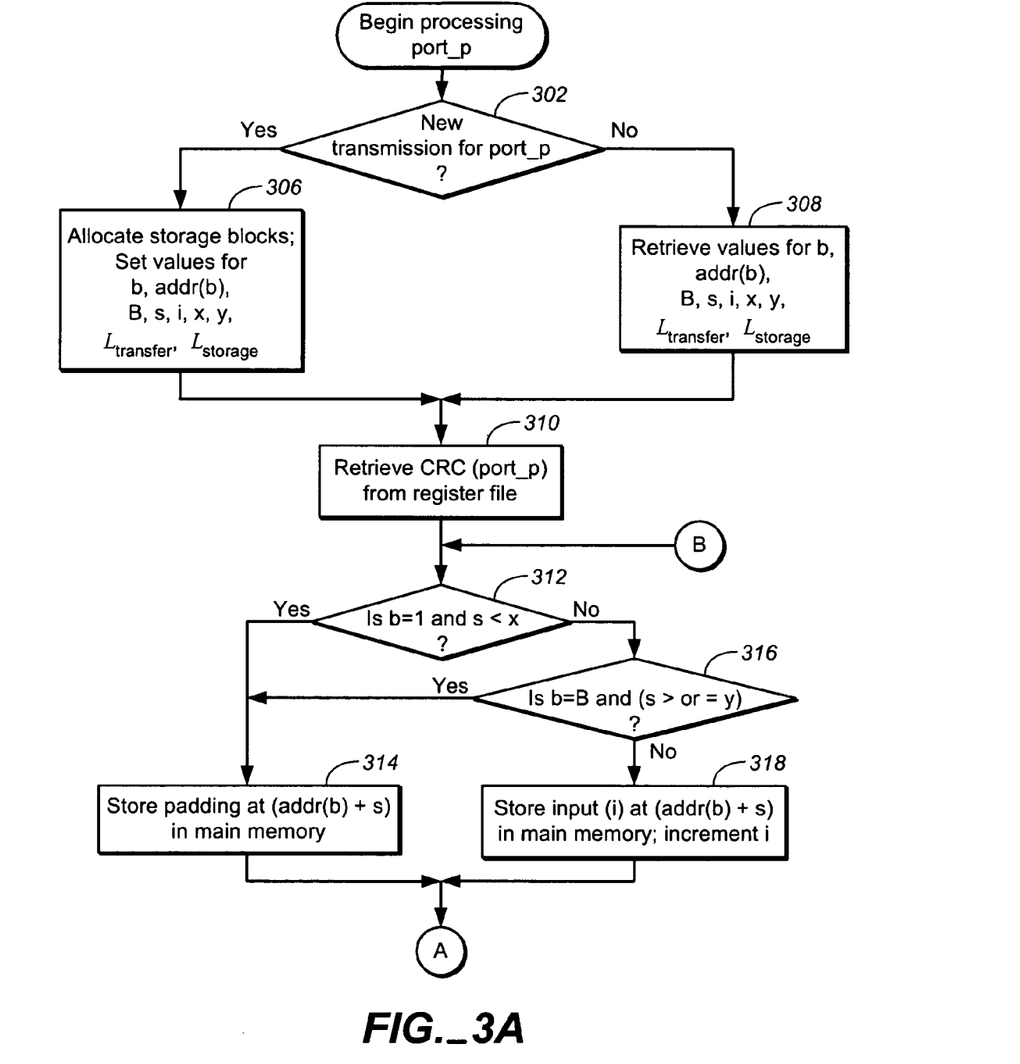
FIGS. 3A-3B together form a flowchart of the actions taken in maintaining the data integrity on the input side of the device.
Figure 3B:
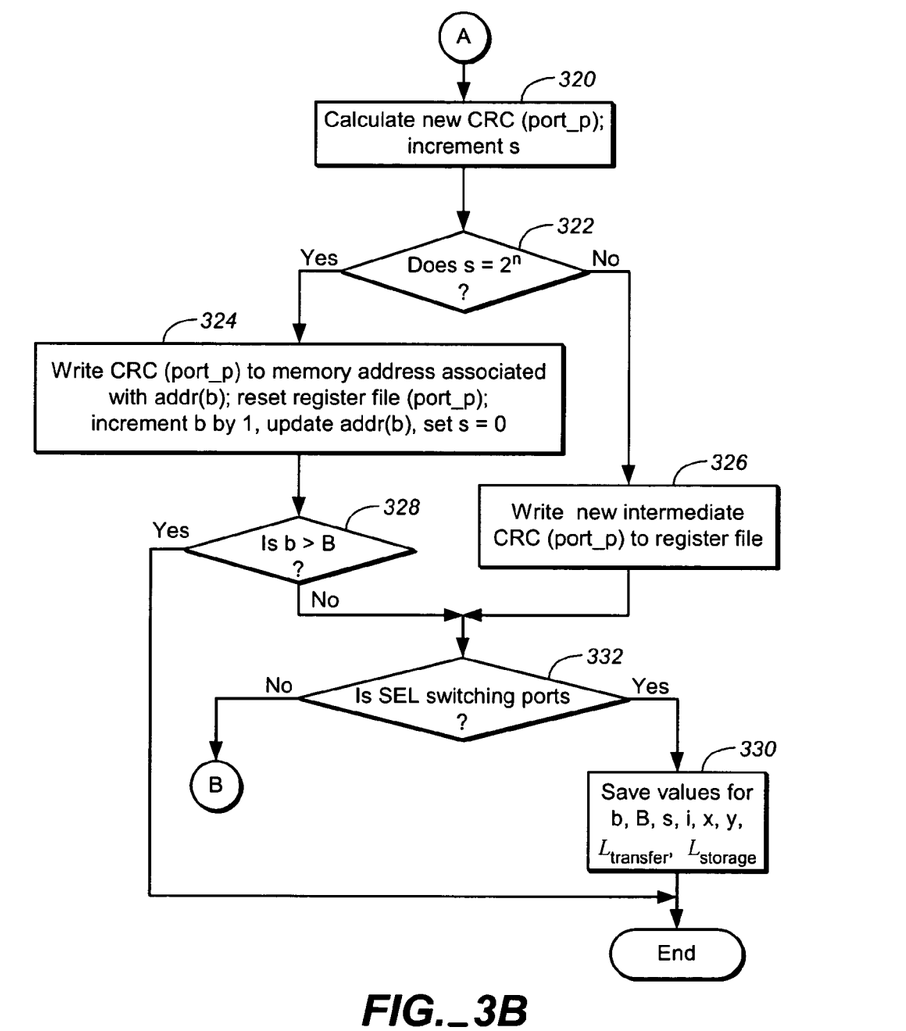

The actions taking place in the interface protocol chip will now be explained with reference to FIGS. 3A-3D. As these actions are discussed, it is helpful to keep in mind the following limitations: 1) stored data must begin and end on a block boundary and 2) any padding can only be done at the beginning and/or end of a transfer. Additionally, for the purposes of this discussion, data is stored in the memory in blocks 1024 bytes ($2^{10}$ or 1K) long. As mentioned above, the CRC engine is shared by both the input and output side of the device and may support more than one port at a time. The selector switch SEL is used to determine which port is connected to the CRC engine at any given time. FIG. 3A, which is continued on FIG. 3B, shows the flowchart for protecting input-data. This flow begins when the selector sends input from a port, here referred to as port_p, to the CRC engine. When the device receives input from a given protocol, the data will generally have an embedded protection code according to the protocol from which it is coming, e.g. the bus. Rather than passing this protection code through the memory device, which can be expensive in terms of memory space, bandwidth and logic complexity, the protection code is first checked to ensure that the data is correct, then the protection code is discarded. When the CRC engine is entered, it is necessary to determine if this is a new transmission for port_p or the resumption of a transmission that was not previously completed (step 302). If it is a new transmission, blocks for storage will be allocated and values will be set for the variables $L_{transfer}$, $L_{storage}$, b, addr(b), B, s, i, x, and y, as explained below (step 306). The transfer length, $L_{transfer}$, is determined by the source of the data, in this example, either a bus or a tape, and will be received as input. For hardware to manage the protection, the stored data must begin and end on a block boundary. Since the blocks are 1K long in this example, $L_{storage}$ will be set to the lowest multiple of 1K that is equal to or greater than $L_{transfer}$. If $L_{transfer}$ is not equal to $L_{storage}$ (as happens most of the time), the additional space must be padded with known values, such as zeros. If, for example, $L_{transfer}=6.5K$, seven blocks will be allocated and $L_{storage}=7K$. Variable B is set to the number of blocks used, in this case seven (7), while b is the number of the current block being used and is set to one (1); addr (b) refers to the beginning address of the current block and will be initialized to the address of the first block allocated. Variable s is an offset into the current block, while variable i is the offset into the input buffer; both are initialized to zero (0). Finally, variables x and y define the amount of padding needed at the beginning and end of the storage respectively. When handled by hardware, x is generally zero (0), although this is not necessary to the method; y is always equal to $((L_{storage}-L_{transfer})-x)$. In the example, if x=0, then y=512. Because of the limitation that padding can only be done at the beginning and end of the transmission, it is only necessary to check the value of x if b=1 and to check y only if b=B. The hardware is enabled to set the values of all these variables.

If this is not a new transmission, but the resumption of a previous transmission that was not completed, the values for the variables, b, B, s, i, x, y, $L_{transfer}$, and $L_{storage}$ will have been previously stored and are retrieved (step 308).

In order that the CRC engine can be interrupted, it maintains its calculations-in-progress in a register file, saved according to the port being used. The CRC engine retrieves this value, CRC(port_p), at the beginning of the calculations (step 310); for a new transmission, this value will be a null value.

The CRC engine first checks if the value of (b=1 and s is less than x), i.e., if there is any padding necessary at the beginning of the stored data (step 312). If the answer is "yes", a byte of padding, which in this example is zero, is stored in the data memory at (addr(b)+s) (step 314). If the answer is "no", the engine checks further if (b=1 and s≧y), i.e., if padding is necessary at the end of the stored data (step 316). An answer of "yes" here will also cause the engine to store padding in the data memory at (addr(b)+s) (step 314). If, however, the answer to the questions of both step 312 and step 316 are 'no', input byte (i) is stored at (addr(b)+s) of the memory and i is incremented by 1 (step 318). Regardless of what was stored at offset s, the CRC engine calculates a new CRC value, incorporating the latest stored value into the previous calculations, then, the value of s is incremented by 1 (step 320).

Once the CRC value has been updated, it is necessary to check whether the stored information has reached a block boundary (i.e. whether s=1024 in this example) (step 322), as this will determine whether the CRC value is a temporary value or a final value. If the end-of-block has been reached ("yes"), the CRC calculation is complete and the CRC value will be written to CRC memory (step 324). This memory is located on memory device 112, but can be separate from the data memory. The CRC value is stored at a mapped location with respect to the block it protects, facilitating hardware handling of the coding. Once this is done, the register file for port_p is reset to a null value and the CRC engine is ready to proceed. Since the current block b has just been updated, a check to see if b>B (the total number of blocks) is next made (step 328). If the current block is greater than the total number of blocks, this input is complete and the flowchart is exited. If not, the flowchart goes to step 332, which will be discussed below. Returning to step 322, if a block boundary was not found, the new intermediate value of CRC (port_p) is written to the register file so that it will not be lost if the selector shifts to another port (step 326) and this branch also proceeds to step 332.

If the selection switch chooses to switch ports, it can do so at this point (step 332). If the selector switch is changing ports, the values of b, B, addr(b), i, s, x, y, $L_{storage}$, and $L_{transfer}$ are saved for port_p (step 330) and the flowchart is exited. Otherwise, the flow returns to step 312 to continue processing the present transmission.

Figure 3C:
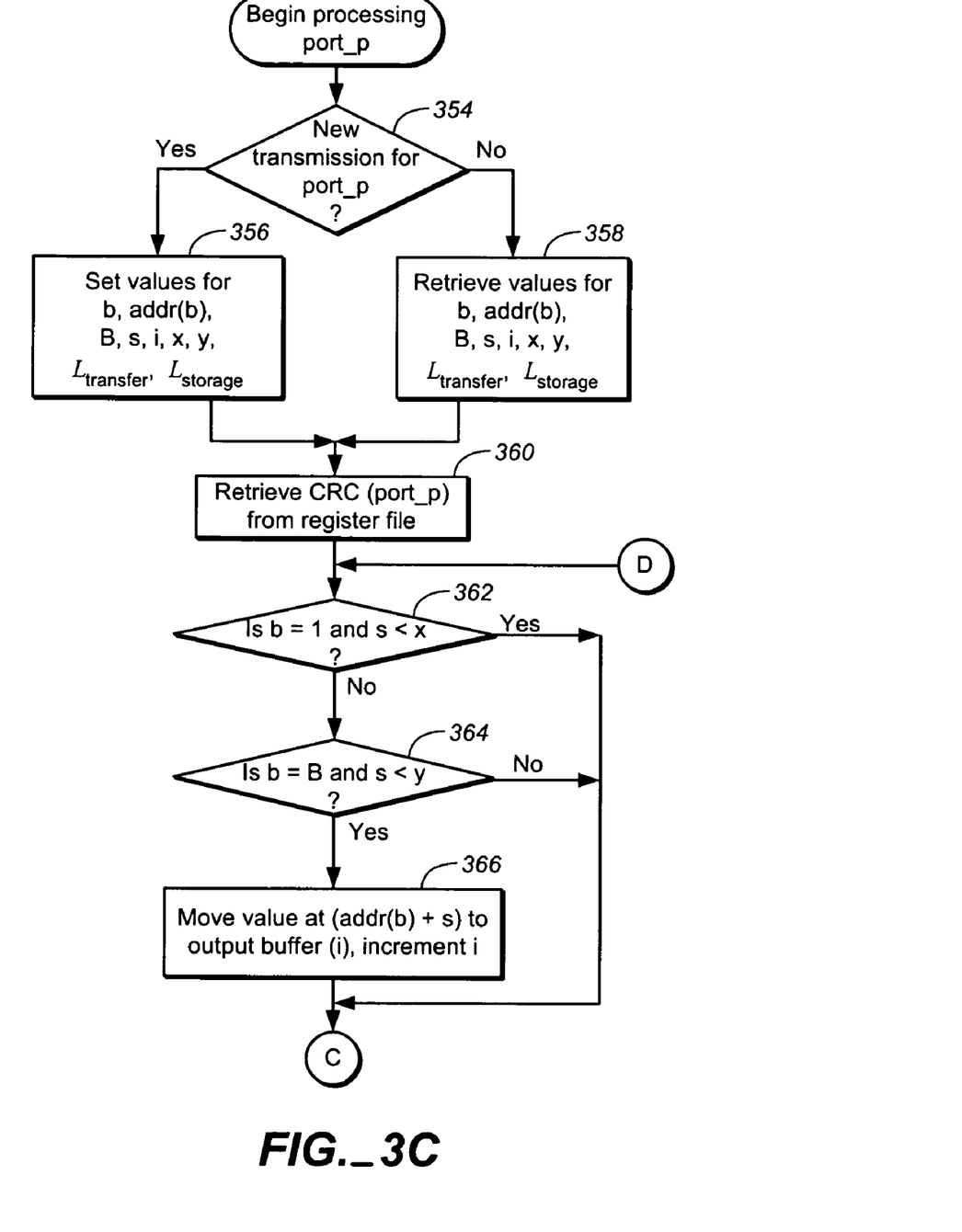
FIG. 3C-3D together form a flowchart of the actions taken in maintaining the data integrity on the output side of the device.
Figure 3D:
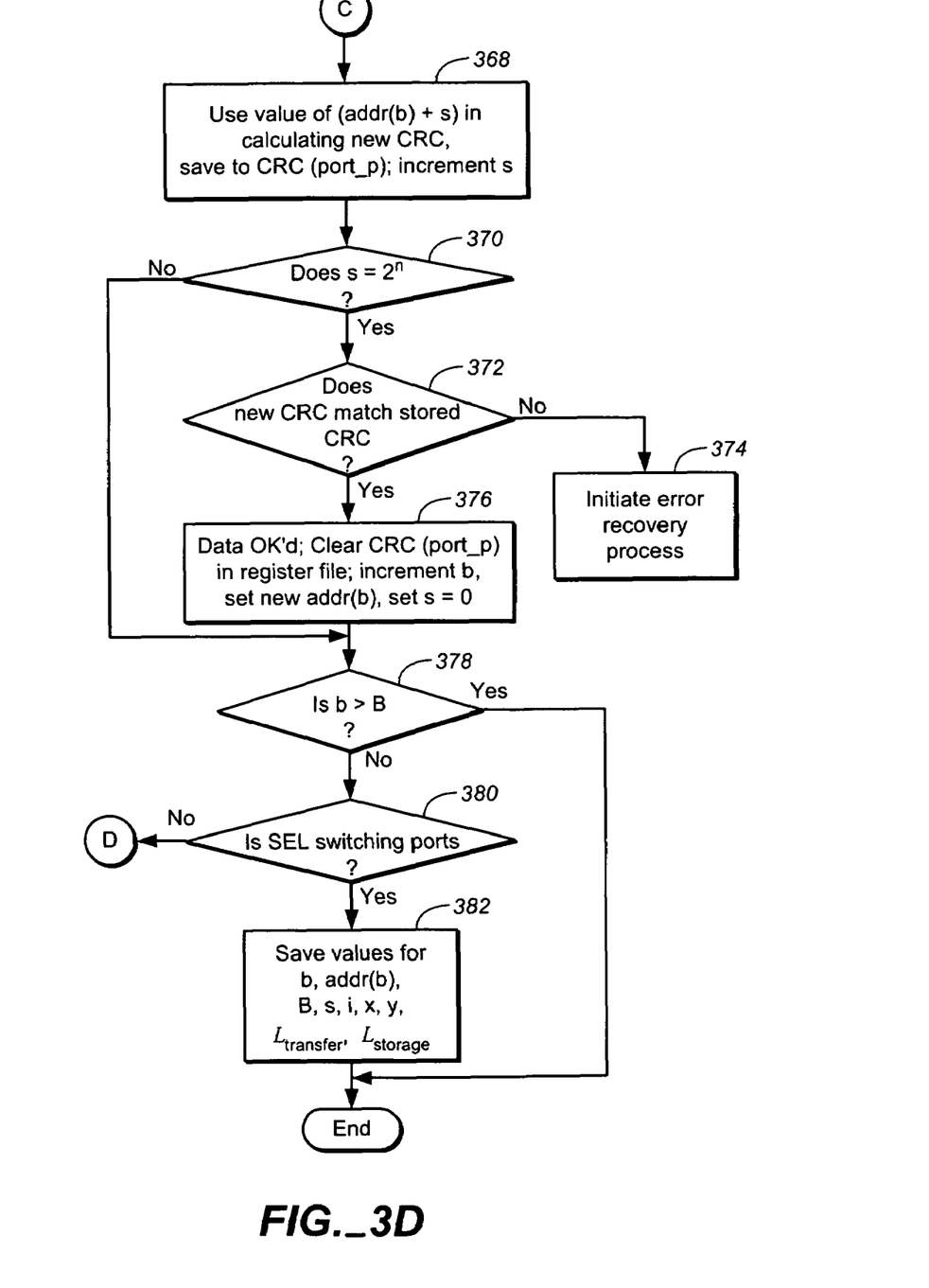

Next, FIG. 3C, which is continued on FIG. 3D, shows the flowchart for checking output data read from the DDR SDRAM memory chip. As in the previous flow, all the ports share a single CRC engine, so information for each port must be carefully saved so that the values are accessible when processing for that port resumes. The flow begins when processing for port_p is initiated. When entered, the CRC engine first checks whether this is a new transmission for port_p or this is a continuation of a previous transmission (step 354). If this is a new transaction, the values of b, B, addr(b), i, s, x, y, $L_{storage}$, and $L_{transfer}$ are set (step 356). If this is a continuation of a previous transmission, these values will be retrieved from where they were previously stored (step 358). The value of CRC (port_p) is retrieved from the register file (step 360). If (b=1 and s<x) (step 362) or if (b=B and s is equal or greater than y) (step 364), then the current byte was previously padded and the byte will not be moved to the output buffer. If neither condition is true, the byte at (addr(b)+s) is moved to the output buffer (i) and i is incremented (step 366). Regardless of whether the byte was moved to the output buffer or not, it is used to calculate the CRC value, the new value is saved to CRC(port_p), and s is incremented by 1 (step 368).

In order to check that the data being output is correct, the next step is to determine whether the end of a block boundary has been reached, e.g., $s=2^n$ (step 370). If it has not, the next few steps will be skipped and the flow proceeds to step 378. If the end of a block has been reached, the next step is to check to see if the newly calculated CRC value matches the value stored in the CRC random access memory when the data was stored (step 372). If the two values match, the data thus far is correct and can be sent. The stored value of CRC(port_p) in the register file is reset, b is incremented by 1 and s is set to 0 (step 376) to prepare for processing the next block, otherwise an error recovery process is initiated according to protocol (step 374). The CRC value that was stored in the mapped location will remain intact until the space is next needed. Next, the engine checks for the completion of the current transmission, e.g., if b>B (step 378). If it is, the flowchart is exited. If further data remains in this transmission, it is necessary to determine if the selector will be switching to process another port (step 380). If it is, the values of b, B, addr(b), i, s, x, y, $L_{storage}$, and $L_{transfer}$ are saved for this port (step 382) and the flow ends. If not, processing will return to step 362 and continue.

The foregoing description has shown a device and method for maintaining data protection as data is passed between two protocols. The advantages of this method and device are that the protection can be entirely hardware based, even when the data transfers are of arbitrary lengths. This embodiment minimizes the cost of the buffer portion of the system and uses a single CRC engine for multiple data flows.

The description of the preferred embodiment of the present invention has been presented for purposes of illustration and description, but is not intended to be exhaustive or limited to the invention in the form disclosed. Many modifications and variations will be apparent to those of ordinary skill in the art. For example, the number of ports on the device can vary between embodiments; e.g., in alternate embodiments, the CRC engine can support multiple ports on both sides of the device. Additionally, the busses shown can be a fabric of connections, rather than single busses. The exemplary embodiment was shown with padding equal to zero. In other embodiments, other padding can be used. For example, the padding may consist of data read during tape read-ahead. In another alternative, the CRC register file 212 can be part of the CRC RAM 214 if data path bandwidth is sufficient. Additionally, although the invention was described using a DDR SDRAM placed between a bus and a tape drive, it is not limited to this embodiment. In alternate embodiments, the invention can be practiced in a device such as bridge that maps different protocols with different block sizes. Alternatively, the invention can be practiced in a buffer used to translate RapidiIO to Fibre Channel. The embodiment was chosen and described in order to best explain the principles of the invention the practical application to enable others of ordinary skill in the art to understand the invention for various embodiments with various modifications as are suited to the particular use contemplated.

What is claimed is:

1. A method for protecting data as it passes between first and second protocols that use different block sizes or unblocked data, said method comprising:

connecting a protocol interface device between a first device that uses the first protocol and a second device that uses the second protocol, and connecting a memory device to the protocol interface device;

said protocol interface device including a cyclical redundancy code (CRC) engine;

allocating a plurality of blocks of storage in a first memory in the memory device for storing a transfer length of unblocked data;

receiving said data on a first port of said protocol interface device from the first device said first device determining said transfer length;

said protocol interface device writing said data, as said data is received, to successive ones of said plurality of blocks until an end of said transfer length is reached, each one of said plurality of blocks having a length of $2^n$, where n is a positive integer;

when the CRC engine determines that an end one of said plurality of blocks that includes an end of said transfer length is not full of data, adding padding to said end one of said plurality of blocks until said end of said plurality of blocks is complete, wherein padding is added only to an end one of said plurality of blocks that includes an end of said transfer length until the end one of the plurality of blocks is complete;

as said data is being written to each one of said plurality of blocks: calculating, by said CRC engine, a running cyclical redundancy code for each of said plurality of blocks by calculating an intermediate cyclical redundancy code after each byte of said data is written to each one of the plurality of blocks;

after each intermediate cyclical redundancy code is calculated: storing, in a CRC memory that is included in the protocol interface device, said intermediate cyclical redundancy code along with information that identifies said first port, the CRC memory being separate from but connected to said CRC engine;

when writing to each one of said plurality of blocks is completed, storing, for each one of said plurality of blocks, a final value of said running cyclical redundancy code that was calculated for each one of said plurality of blocks as a first cyclical redundancy code in a second memory in said memory device; and when said data is to be written to a second port of the protocol interface device: using said CRC engine to compute a second cyclical redundancy code for each of said plurality of blocks; comparing, using a comparator that is included in the protocol interface device and coupled to the CRC engine, said second cyclical redundancy code corresponding to a given block to said first cyclical redundancy code corresponding to said given block; and when said second cyclical redundancy code corresponding to the given block is equal to said first cyclical redundancy code corresponding to said given block, writing said given block to said second port.

2. The method of claim 1, wherein the data is received with a protection code that is checked and discarded.

3. The method of claim 1, wherein said memory device is a DDR device the first device is a bus and the second device is a tape drive.

4. The method of claim 1, further comprising:

coupling said first device to said first port, and coupling said second device to said second port; the protocol interface device including a selector switch that is coupled to said first port and said second port;

coupling said selector switch to said CRC engine;

using the selector switch to select one of the first port and the second port to which to couple the CRC engine, said CRC engine coupled to only one of the first and second ports at a time; and the CRC engine communicating with said first device and said second device only through said selector switch.

5. The method of claim 1, wherein locations in said second memory are mapped to locations in said first memory.

6. A device for buffering data between two protocols, at least one of which does not utilize blocks, said device comprising:

a first port connected to communicate using a first protocol of said two protocols;

a second port connected to communicate using a second protocol of said two protocols;

a cyclical redundancy code (CRC) engine connected to be selectively connected to one of said first port and said second port;

a plurality of blocks of storage that have been allocated for storing a transfer length of unblocked data;

a first random access memory connected to said cyclical redundancy code engine and including said plurality of blocks for storing said data that is passing between said first port and said second port, said data being written to successive ones of said plurality of blocks as said data is received until an end one of said transfer length is reached, each one of said plurality of blocks having a fixed size;

when said CRC engine determines that an end said plurality of blocks that includes an end of said transfer length is not full of data, padding being added to said end one of said plurality of blocks until said end of said plurality of blocks is complete, wherein padding is added only to an end one of said plurality of blocks that includes an end of said transfer length;

said cyclical redundancy code engine calculating a running cyclical redundancy code for each one of said plurality of blocks as data is written to each one of said plurality of blocks by calculating an intermediate cyclical redundancy code after each byte of said data is written to each one of the plurality of blocks;

a CRC memory for, after each intermediate cyclical redundancy code is calculated, storing said intermediate cyclical redundancy code along with information that identifies one of the first or second ports through which said data was received;

a second random access memory connected to said cyclical redundancy code engine for storing, for each one of said plurality of blocks, a final value of said running cyclical redundancy code that was calculated for each one of said plurality of blocks as a first cyclical redundancy code when writing to each one of said plurality of blocks is completed; and a comparator connected to compare a second cyclical redundancy code calculated for each one of said plurality of blocks with said first cyclical redundancy code calculated when writing of each one of said plurality of block is written to one of the first or second ports;

whereby the data passed through said device is protected by a cyclical redundancy code.

7. The device of claim 6, wherein said cyclical redundancy codes are stored in said second random access memory in a mapped relationship to said fixed size blocks stored in said first random access memory.

8. The device of claim 6, further comprising a protection module connected to said first port for checking a protection code that is received and discarding said protection code.

9. The device of claim 6, wherein locations in said second random access memory are mapped to locations in said first random access memory.

10. A computer program product on a computer-readable device, comprising the computer implemented steps of:

a protocol interface device connected between a first device that uses the first protocol and a second device that uses the second protocol, and connecting a memory device to the protocol interface device;

said protocol interface device including a cyclical redundancy code (CRC) engine;

first instructions for allocating a plurality of blocks of storage in the memory device for storing a transfer length of unblocked data;

second instructions for receiving said data on a first port of said protocol interface device from the first device said first device determining said transfer length;

third instructions for writing, by the protocol interface device, said data to a first memory in a buffering device, as said data is received, to successive ones of said plurality of blocks until an end of said transfer length is reached, each one of said plurality of blocks having a length of $2^n$, where n is a positive integer;

when the CRC engine determine that an end one of said plurality of blocks that includes an end of said transfer length is not full of data, fourth instructions for adding padding to said end one of said plurality of blocks until said end one of said plurality of blocks is complete, wherein padding is added only to an end one of said plurality of blocks that includes an end of said transfer length;

fifth instructions for calculating, by the CRC engine, a running first cyclical redundancy code for each of said plurality of blocks as data is being written to each one of said plurality of blocks by calculating an intermediate cyclical redundancy code after each byte of said data is written to each one of the plurality of blocks;

after each intermediate cyclical redundancy code is calculated: sixth instructions for storing, in a CRC memory that is included in the protocol interface device, said intermediate cyclical redundancy code along with information that identifies said first port, the CRC memory being separate from but connected to said CRC engine;

seventh instructions for when writing to each one of said plurality of blocks is completed, storing, for each one of said plurality of blocks, a final value of said running cyclical redundancy code that was calculated for each one of said plurality of blocks as a first cyclical redundancy code in a second memory in said memory device ; and when said data is written to a second port of the protocol interface device: eighth instructions for using said CRS engine to compute a second cyclical redundancy code for each of said blocks of said plurality of blocks; ninth instructions for comparing, using a comparator that is included in the protocol interface device and coupled to the CRC engine, said second cyclical redundancy code corresponding to a given block to said first cyclical redundancy code corresponding to said given block:

and when said second cyclical redundancy code corresponding to the given block is equal to said first cyclical redundancy code corresponding to said given block, tenth instruction for writing said given block to said second port.

11. The computer program product of claim 10, wherein said second instructions check a protection code received with the data and discarded said protection code.

12. The computer program product of claim 10, wherein said first device is a bus and the second device is a tape drive.

13. The method according to claim 4, further comprising:
said selector switch being used to select the second port;
in response to said second port being selected, receiving new data on said selected second port from said second device;
said protocol interface device writing said new data, as said data is received, to successive ones of a second plurality of blocks until an end of said transfer length is reached, each one of said second plurality of blocks having a length of $2^n$, where n is a positive integer;
as said data is being written to each one of said second plurality of blocks: calculating, by said CRC engine, a second running cyclical redundancy code for each of said second plurality of blocks by calculating a second intermediate cyclical redundancy code after each byte of said data is written to each one of the plurality of blocks; and
after each second intermediate cyclical redundancy code is calculated: storing in the CRC memory that is included in the protocol interface device, said second intermediate cyclical redundancy code along with information that identifies said second port.

14. The device according to claim 6, further comprising:
a first device coupled to said first port;
a second device coupled to said second port;
a selector switch coupled to said first port, said second port, and said CRC engine;
the selector switch for selecting one of the first port and the second port;
said CRC engine coupled to only one of the first and second ports at a time; and
the CRC engine communicating with said first device and said second device only through said selector switch.

* * * * *